June 10, 1941.   J. P. BURKE   2,244,823
SNAP FASTENER NUT
Filed July 3, 1939

INVENTOR.
James P. Burke
BY J. Windsor Davis
ATTORNEY.

Patented June 10, 1941

2,244,823

UNITED STATES PATENT OFFICE 2,244,823

SNAP FASTENER NUT

James P. Burke, Knoxville, Tenn., assignor to Bert L. Quarnstrom and F. L. McLaughlin, both of Detroit, Mich.

Application July 3, 1939, Serial No. 282,752

3 Claims. (Cl. 85—32)

This invention relates to nuts and has for its primary object to provide a nut having means for retaining itself on one of a plurality of members to be secured together in order to avoid the necessity of holding the nut in place or against rotation when a screw or bolt is inserted therein, and in order that the nut may serve as a locating means for relatively positioning a plurality of members to be secured together. In this broad aspect the invention is similar to the subject matter shown and claimed in my Patent 2,164,-382, issued July 4, 1939, with which this application is co-pending.

In the patent above referred to the function of securing the nut in place and against rotation is obtained through use of coacting parts of the nut and the supporting member which are rendered operative by rotation. This invention differs from my prior invention by the provision of retaining means which functions in the manner of a snap fastening device.

Another object of this invention is to provide a nut composed of thin metal bent to provide a snap fastening means and a screw receiving portion. To this end, the thin metal of which the nut is formed is bent into U-shape, and comprises a base portion with two parallel upstanding branch portions pierced and bent to provide coacting shoulder portions. The base portion is pierced, slitted and bent to provide lead portions enabling the base portion to function as a thread. The base portion is preferably thicker and/or stiffer than the branch portions, a result obtained either by increasing thickness by providing a plurality of folds or laminations or by the use of reinforcing shapes or designs. As a result of this condition, the yielding or flexing necessary to snap one pair of shoulders through an aperture takes place in the branch portions or the inserted shoulders rather than in the base portion. This is desirable because it avoids distortion of the thread portion in the base portion.

Figure 1:
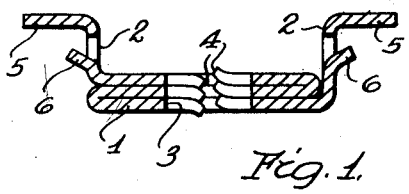
Figure 2:
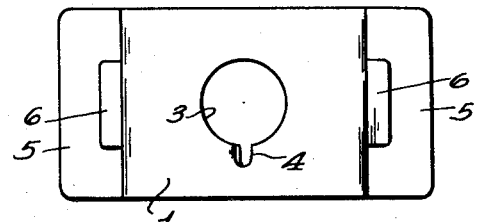
Figure 3:
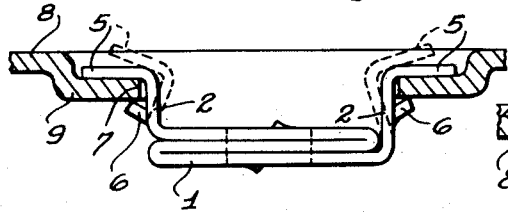
Figure 4:
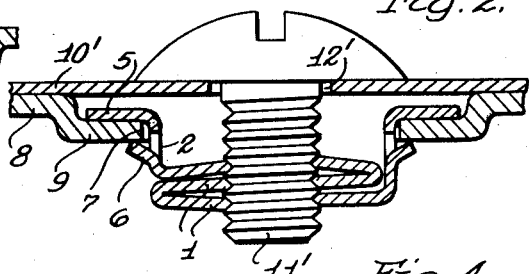
Figure 5:
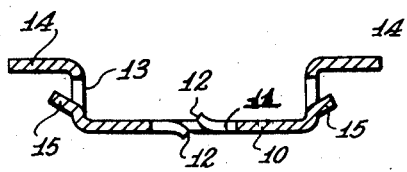
Figure 6:
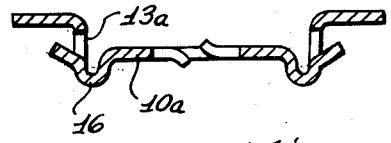
Figure 7:
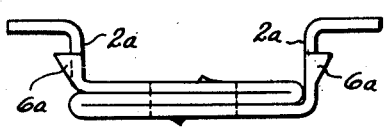
Figure 10:
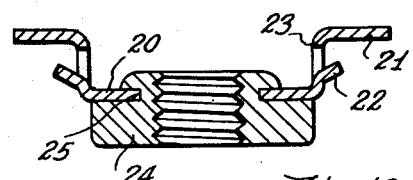
Figure 8:
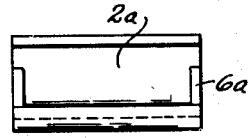
Figure 11:
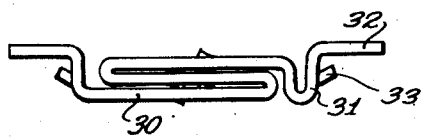
Figure 9:
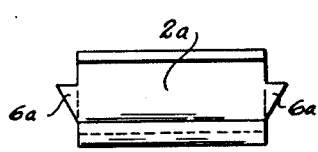

Other objects and advantages will become more fully apparent as reference is had to the accompanying drawing wherein my invention is illustrated, and in which Fig. 1 is a vertical section of the nut, Fig. 2 is a bottom plan view, Fig. 3 illustrates the nut snap fastened to an apertured member, Fig. 4 is a section illustrating the nut in its operative relation with the members to be held together, Fig. 5 is a section illustrating a single thread nut, Fig. 6 is a section illustrating a single thread nut with stiffening portions, Fig. 7 is a side elevation illustrating an alternative manner of forming the snap fastening prongs, Fig. 8 is an end elevation corresponding with Fig. 7, Fig. 9 is an end elevation similar to Fig. 8, but illustrating the prongs prior to bending thereof, Fig. 10 illustrates a nut having an internally threaded clinch nut clinched thereon, and Fig. 11 is a side elevation of a modification.

Referring more particularly to Figs. 1 to 4, the nut is of U-shape as viewed in side elevation or in one cross section, and is comprised of a single piece of thin metal so bent as to provide a base portion 1, composed of a multiplicity of folds, and two parallel branches 2, upstanding with respect to the base portion. The several folds of the base portion are each pierced to provide a circular aperture 3 and a radial slit 4. The metal on opposite sides of the slits is bent in such manner as to provide a lead angle which enables each fold to function as a thread.

The upstanding branch portions 2 are bent laterally outwardly to form shoulders 5, and have prong-like portions 6 struck outwardly and constituting a second or additional set of shoulders in spaced relation to the first set 5.

As viewed in Fig. 2, the folded or base portion of the nut is rectangular, and the upstanding branch portions 2 arise from opposite ends of this rectangular formation. This shape prevents turning of the nut when it is inserted in an aperture having a similar shape.

Fig. 3 illustrates the nut assembled in an aperture 7 of a sheet member 8, the member 8 preferably having a concavo-convex formation 9 in the bottom of which the aperture is located. To assemble the nut in the relation shown the base portion 1 is inserted through the aperture, and the prong-like shoulders 6 are enabled to pass through the aperture by flexing of the branch portions as indicated by dotted lines. When the prong-like shoulders pass the marginal wall of the aperture they snap into engagement with the bottom surface of the member, and coact with the shoulder portions 5 in holding the nut with respect to the member 8. In other words, the shoulders 5 and 6 snare portions of the member 8 therebetween to retain the nut on the member 8. The concavo-convex portion 9 results in a recess in which the shoulders 5 are located and therefore disposed below the plane of the top surface of the member 8.

A second sheet member 10' is secured to the member 8 by inserting a screw or bolt 11' through an aperture 12' therein and into engagement with the base portion of the nut. The width of the threads on the screw or bolt 11' is greater than the thickness of the metal from which the nut is formed, and the folds are spread apart. As the screw is tightened it tends to pull the spread folds back together with the result that the folds set up a binding action tending to prevent removal of the screw.

The multiple folds of the base portion 1 render the base portion stiffer than the upstanding branch portions 2 and the prong-like shoulders 6. Therefore, deflection necessary to snap the shoulders 6 through the aperture is confined either to the branch portions 2 or the shoulders 6. Distortion of the base portion such as might interfere with insertion of the screw is thus avoided. It is contemplated, however, that where a single thread is sufficient the base portion may be composed of a single thickness of metal. This is shown in Fig. 5 where a base 10, composed of a single thickness of metal, is pierced at 11 and slitted and bent at 12 to enable the wall of the aperture to function as a thread. Upstanding branch portions 13, integral with the base portion, are bent laterally outward to provide shoulder portions 14 and have portions thereof struck outwardly to provide prong-like shoulders 15 in spaced relation to the shoulders 14.

In Fig. 6 the construction is quite similar to that shown in Fig. 5 in that the base portion 10a is composed of a single thickness of metal. In this case the base portion is connected to the upstanding branch portions 13a by reversely bent portions 16. The portions 16 constitute spring portions which enable flexing of the branches without bending the base portion.

Figs. 7, 8 and 9 illustrate a nut similar to that shown in Fig. 1 with an alternative formation of the prong-like shoulder members. In Figs. 7, 8 and 9 the prong-like shoulders 6a are formed by providing prong-like extensions on the ends of the branch portions 2a, originally shaped as shown in Fig. 9, and subsequently bent to the position shown in Figs. 7 and 8.

Fig. 10 illustrates a nut formed with a base portion 20, two sets 21 and 22 of shoulders integrally connected to the base portion by upstanding branch portions 23, and a standard nut 24 clinched in an aperture 25 in the base portion.

Fig. 11 illustrates a nut wherein the multiple fold base portion 30 is nested within the branch portions 31, upon which the shoulder portions 32 and 33 are formed. The base portion is spaced from the branch portions at both ends to enable inward flexing of the branches.

What is claimed is:

1. A nut composed of a single piece of resiliently yieldable stock and of U-shape cross section, the base of said U being of multiple folds jointly pierced to provide a screw receiving opening, and shoulder portions extending laterally of each the branches of said U at spaced points along the length thereof, said branches being adapted to be compressed toward each other to enable certain of said shoulders to snap past the walls of an aperture.

2. A nut of a single piece of resiliently flexible thin material bent into a U-shaped cross section with the base of the U comprising folded portions thereby forming a multiple thickness, the branches of said U being turned laterally outwardly, and shoulder portions extending laterally outwardly from each of said branches below the outwardly extending ends thereof, said branches being resiliently compressible toward each other to enable some of said shoulders to snap past the walls of an aperture.

3. A nut of U-shape in cross-section comprising integral branches joined by a base portion of multiple folds, the folds of said base being jointly pierced to receive a screw, the outer ends of said branches being turned laterally outwardly to form shoulders and additional shoulders extending laterally outwardly from said base portion, in combination with a sheet of material having a depressed portion pierced to receive said nut, said additional shoulders being yieldable toward each other upon application of pressure in forcing said nut into said opening whereby said sheet is snared between the sets of shoulders, and a screw extending through both of said openings for securing said sheets together, said screw upon being rotated forcing said additional shoulders against the first named sheet and spreading the folds of said base portion to lock all of the parts in fixed relation.

JAMES P. BURKE.